US006658886B1

(12) United States Patent  
Bass (10) Patent No.: US 6,658,886 B1
(45) Date of Patent: Dec. 9, 2003

(54) POULTRY CHILLER HAVING AN INTEGRAL SUMP COMPARTMENT

(75) Inventor: Gregory T. Bass, Clayton, NC (US)

(73) Assignee: Morris & Associates, Inc., Garner, NC (US)

( * ) Notice: Subject to any disclaimer, the term of this patent is extended or adjusted under 35 U.S.C. 154(b) by 0 days.

(21) Appl. No.: 10/350,443

(22) Filed: Jan. 24, 2003

(51) Int. Cl.7 .............................................. F25D 25/02
(52) U.S. Cl. ........................ 62/381; 62/374; 62/375; 62/376
(58) Field of Search ........................... 62/63, 64, 374, 62/381, 375, 376

(56) References Cited

U.S. PATENT DOCUMENTS

| | | | |
|---|---|---|---|
| 3,250,086 A | 5/1966 | Morris, Jr. .................... 62/375 |
| 3,368,363 A | 2/1968 | Alaburda et al. .............. 62/64 |
| 4,860,554 A * | 8/1989 | Innes et al. ................... 62/374 |
| 5,184,471 A | 2/1993 | Losacco et al. ................ 62/63 |
| 5,319,939 A * | 6/1994 | McFadden et al. ............ 62/63 |
| 5,329,842 A | 7/1994 | Zittel ........................... 99/348 |
| 5,429,041 A | 7/1995 | Zittel ........................... 99/348 |
| 5,456,091 A | 10/1995 | Zittel ........................... 62/375 |
| 5,752,431 A | 5/1998 | Zittel ........................... 99/348 |
| 6,089,037 A * | 7/2000 | Miller et al. .................. 62/314 |
| 6,095,035 A * | 8/2000 | Zittel et al. ................... 99/348 |
| 6,161,613 A | 12/2000 | Huenniger .................... 165/145 |
| 6,214,400 B1 | 4/2001 | Zittel et al. ................... 426/509 |
| 6,234,066 B1 | 5/2001 | Zittel et al. ................... 99/348 |
| 6,263,785 B1 | 7/2001 | Zittel ........................... 99/348 |
| 6,308,529 B1 * | 10/2001 | Bass ............................. 62/381 |
| 6,397,622 B1 * | 6/2002 | Miller et al. .................. 62/381 |

* cited by examiner

Primary Examiner—William E. Tapolcai
Assistant Examiner—Mohammad M. Ali
(74) Attorney, Agent, or Firm—Thomas, Kayden, Horstemeyer & Risley

(57) ABSTRACT

A chiller for reducing the temperature of previously eviscerated whole birds and the like, includes a tank having a bird outlet end, a bird inlet end, an inlet end plate, an outlet end plate, and a water reservoir between the ends. The poultry chiller also includes water circulation means for introducing water into the reservoir at the bird outlet end of the tank, draining water at the bird inlet end of the tank, and forming a movement of water generally from the bird outlet end toward the bird inlet end of the tank. The chiller further includes a motive device for urging the birds from the bird inlet end to the bird outlet end of the tank, the motive device being in driven relationship with a power means. A transverse wall having a lower portion, a central portion, and a top edge, is disposed at the bird inlet end of the tank substantially parallel to the inlet end plate such that a sump is formed between the lower portion of the transverse wall and the inlet end plate.

26 Claims, 5 Drawing Sheets

POULTRY CHILLER HAVING AN INTEGRAL SUMP COMPARTMENT

TECHNICAL FIELD

The present invention generally relates to poultry chillers for reducing the temperature of whole birds after the birds have been eviscerated on a poultry processing line. More particularly, the invention relates to a sump compartment formed integrally with the poultry chiller.

BACKGROUND OF THE INVENTION

Figure 1:
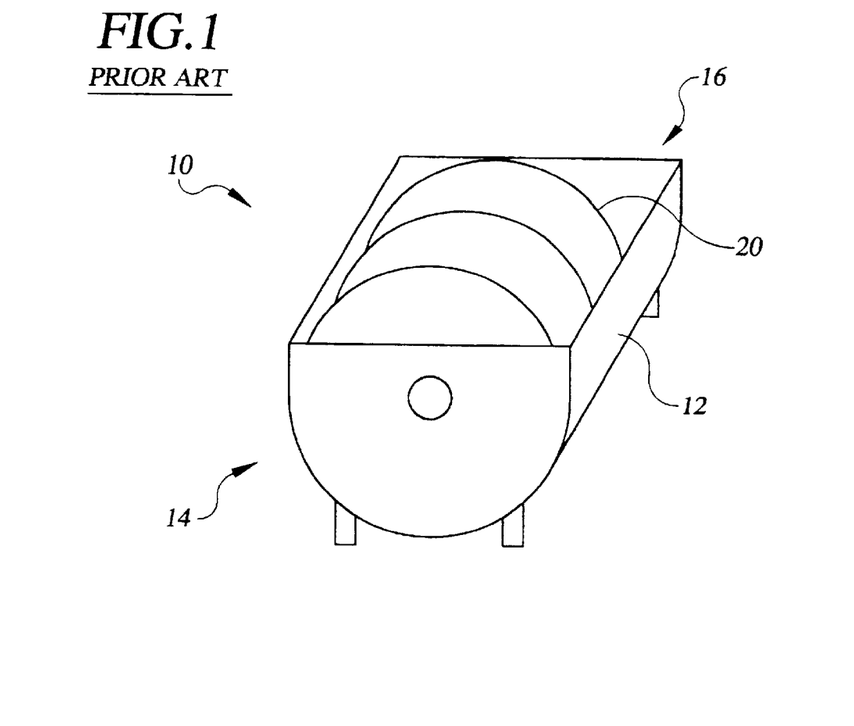
FIG. 1 is a perspective view of a prior art poultry chiller.
Figure 2:
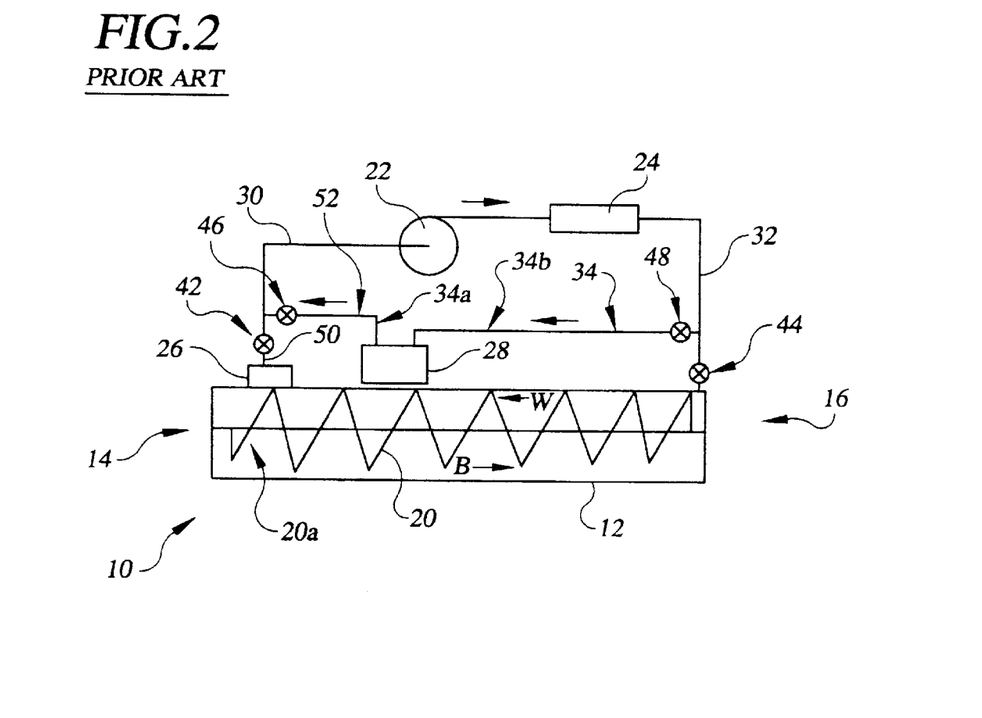
FIG. 2 is a top view schematic diagram of a prior art poultry chiller.

It is desirable to reduce the temperature of chickens and other types of poultry after the birds have been processed, or defeathered, eviscerated and are otherwise oven-ready before the birds are packaged for delivery to the retail customer. A conventional poultry chiller 10, as shown in FIG. 1, is the "auger-type" poultry chiller 10 which includes a trough-shaped, half-round tank 12 filled with cold water in which an auger 20 provides positive movement of the birds through the tank 12. The cooling effect for the water and the birds was originally provided by crushed ice added to the water. As shown in FIG. 2, later designs include a counter-flow recirculation of the chilled water through the tank 12 with the water being chilled by a refrigerated heat exchanger 24 instead of using ice. The water is introduced at one end of the tank 12, the outlet end 16, and flows progressively to the other end, the inlet end 14, where it is recirculated through the heat exchanger 24. In the mean time, the birds are continually delivered to the inlet end 14 of the tank 12 and moved under the influence of the rotating auger 20 in the counter-flow direction and arc lifted from the outlet end 16 of the tank 12 for further processing. A prior art poultry chiller of this general type is disclosed in U.S. Pat. No. 5,868,000, and a heat exchanger for the water refrigeration system suitable for this purpose is shown in U.S. Pat. No. 5,509,470.

As noted, chilled water is added to the tank 12 at the outlet end 16, where the birds have been chilled and are being lifted out of the tank 12. The water flows in the opposite direction of movement of the birds and the auger 20 of the tank 12, thereby insuring that the birds are always flowing into the cleanest and coldest water and that there is always a temperature drop between the temperature of each bird and the temperature of the water about each bird.

During operation, the recirculation pump 22 removes the warmer water from the inlet end 14 oft he tank 12. As shown in FIG. 2, a suction header 30 connects the inlet of recirculation pump 22 to a sump 26. The sump 26 is positioned at an overflow recess in the sidewall of the chiller tank 12 and is below the typical operational water level within the tank 12. A typical sump can measure about 4 feet high and from 2 to 4 feet in width. The sump 26 helps to insure that the inlet of the suction header 30 does not become blocked by birds in the tank and that adequate chill water is present for the recirculation pump 22 to maintain proper suction. A suction valve 42 is disposed in the suction header 30 in close proximity to the sump 26. The outlet of recirculation pump 22 discharges the chill water into a fill header 32 that includes a heat exchanger 24 for chilling the water. After having passed through the heat exchanger 24, the chill water continues down the fill header 32 and enters the tank 12 at the outlet end 16. A fill valve 44 is disposed in the fill header in close proximity to the tank 12.

Side mounted sumps, such as the sump 26, tend to cause operational problems in typical chillers 10. For example, although the warmer water side discharge opening in the wall of tank 12 that is in fluid communication with the side mounted sump 26 is typically rather large, and the sump is approximately 2 to 4 feet wide and 4 feet tall, it is possible for birds to migrate to this portion of the tank 12 wall and be sucked up against the edge of the opening without passing through the opening. If enough birds migrate to the opening into the side mounted sump 26, partial blockage of the access of recirculation water to the suction header 30 can occur. In turn, the performance of the recirculation pump 22 is affected in that chill water flow rate throughout the poultry chiller 10 is reduced. Eventually, the birds will be urged away from the opening to the side mounted sump 26 by the outer periphery of an oncoming flight of the auger 20. However, because full 360° flights on typical augers 20 are frequently longitudinally displaced by 4 feet or more and the auger 20 rotated on the order of 1 turn every 4 minutes, the birds partially blocking the side mounted sump 26 inlet can remain there for extended periods of time prior to being displaced and the reduced flow of recirculation water continues.

Also, as previously noted, the chill water becomes progressively warmer as it moves from the outlet end 16 to the inlet end 14 of the tank 12. Generally, the temperature of the water in front of a flight is colder than the water behind the flight, as much as 2° F. As the auger 20 rotates, the last auger flight funnels water into the side mounted sump 26 sometimes from in front of the flight and other times from behind the flight as the flight passes by the warmer water side discharge opening. This means that when the individual flight 20A funnels water into the side mounted sump primarily from behind the individual flight 20A, the inlet temperature of chill water at the heat exchanger 24 will be warmer than when the majority of water funneled into the side mounted sump 26 is from in front of the individual flight 20A. These temperature variations mean that frequent adjustments must be made to the heat exchanger 24 to maintain a constant chill water temperature in the fill header 32.

To maintain proper sanitary conditions, poultry chillers 10 typically are cleaned on a daily basis. As shown in FIG. 2, prior art poultry chillers 10 include a clean-up tank 28 that holds cleaning solution that is used for cleaning the chill water circulation system of the poultry chiller 10 during shut down of the chiller. Usually, the clean-up tank 28 can be mounted either to the side of the poultry chiller 10 in a manner similar to that of the sump 26, or it may be free standing. Clean-up tanks 28 typically are on the order of 300 to 500 gallons and are connected to the chill water system by a recirculation header 34 and control valves 46 and 48. As shown in FIG. 2, a first portion 34a of the recirculation header 34 taps into the suction header 30 between the suction valve 42 and the recirculation pump 22. A recirculation suction valve 46 is used to either line up or isolate the clean-up tank 28 from the suction header 30. A second portion 34b of the recirculation header 34 taps into the fill header 32 upstream of the fill valve 44 and includes the recirculation fill valve 48 that can be used to either line up or isolate the clean-up tank 28 from the fill header 32.

To clean the poultry chiller 10, the tank 12 is drained of water and birds and cleaning personnel clean the auger 20 and the inside of the tank 12 with hot water and cleaning solution under high pressure. The chill water system is cleaned by shutting the suction valve 42 and the fill valve 44 to isolate the chill water system from the tank 12. A mixture of cleaning solution and hot water is mixed in the clean-up tank 28 by cleaning personnel. The clean-up tank 28 is then aligned with the chill water system by opening the recirculation suction valve 46 and the recirculation fill valve 48. The recirculation pump 22 is now aligned to take suction off the clean-up tank 28, thereby pumping the solution of hot water and cleaning solution through the suction header 30, recirculation pump 22, heat exchanger 24, fill header 32, and the recirculation header 34. Note however, the portion of the suction header 30 disposed between the suction valve 42 and the side mounted sump 26, indicated by reference numeral 50, is not cleaned during recirculation of the cleaning solution from the clean-up tank 28. As such, this portion of the suction header 30 must be cleaned by cleaning personnel, as is the side mounted sump 26.

A number of problems are common to the side mounted sump 26 and the clean-up tank 28 when the clean-up tank 28 is mounted directly to the side of the tank 12. When mounted to the side of the tank 12, the sump 26 and clean-up tank 28 interfere with the routine of the cleaning personnel, and take up space along the side of the poultry chiller 10 which is frequently at a premium. Also, side-mounting the sump 26 and clean-up tank 28 can interfere with the placement of a cat walk (not shown) along the upper edge of the tank 12, as is common in the manufacture of poultry chillers 10. Also, manufacturing the sump 26 and the clean-up tank 28 adds to the overall cost of producing the poultry chiller 10 in that the construction of the typically rectangular boxes requires significant man hours. Additionally, because the clean-up tank 28 is independent of the sump 26, the suction portion 34A of the recirculation header 34 and the recirculation inlet valve 46 are required. If a single tank were used that served both functions, a common portion of suction piping and a single isolation valve could be used.

From the foregoing, it can be appreciated that it would be desirable to have an integral sump compartment for use with the poultry chiller that can function as both a sump for the recirculation pump suction and as a clean-up tank. Thus, a heretofore unaddressed need exists in the industry to address the aforementioned deficiencies and inadequacies.

SUMMARY OF THE INVENTION

Briefly described, an embodiment of a poultry chiller for reducing the temperature of previously eviscerated whole birds and the like, includes a tank having a bird outlet end, a bird inlet end, an inlet end plate, an outlet end plate, and a water reservoir between the ends. The poultry chiller also includes water circulation means for introducing water into the reservoir of the tank at the bird outlet end of the tank, draining water at the bird inlet end of the tank, and forming a movement of water generally from the bird outlet end toward the bird inlet end of the tank. A motive device for urging the birds from the bird inlet end of the tank to the bird outlet end of the tank is included, the motive device being in driven relationship with a power means. A transverse wall having a lower portion, a central portion, and a top edge is disposed at the bird inlet end of the tank and is substantially parallel to the inlet end plate such that a sump is formed between the lower portion of the transverse wall and the inlet end plate.

Other systems, methods, features, and advantages of the present poultry chiller will be or become apparent to one with skill in the art upon examination of the following drawings and detailed description. It is intended that all such additional systems, methods, features, and advantages be included within this description, be within the scope of the poultry chiller, and be protected by the accompanying claims.

BRIEF DESCRIPTION OF THE DRAWINGS

The poultry chiller can be better understood with reference to the following drawings. The components in the drawings are not necessarily to scale, emphasis instead being placed upon clearly illustrating the principle of the poultry chiller. Moreover, in the drawings, like reference numerals designate corresponding parts throughout the several views.

Reference will now be made in detail to the description of the poultry chiller as illustrated in the drawings. While the poultry chiller will be described in connection with these drawings, there is no intent to limit the poultry chiller to the embodiment or embodiments disclosed therein. On the contrary, the intent is to cover all alternatives, modifications, and equivalents included within the spirit and scope of the poultry chiller as defined by the appended claims.

DETAILED DESCRIPTION OF THE PREFERRED EMBODIMENT

Figure 3:
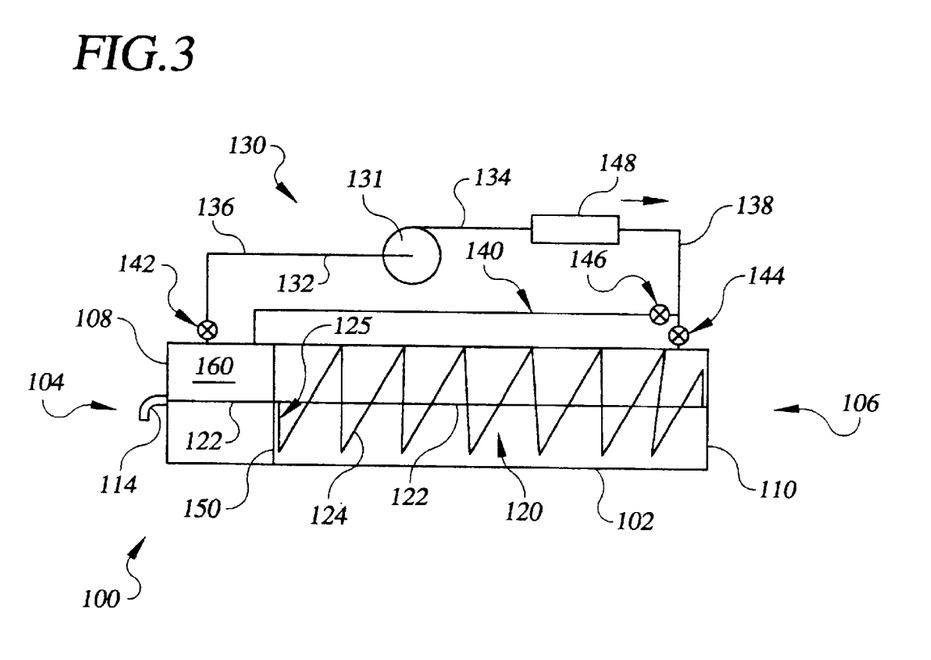
FIG. 3 is a top view schematic diagram of a poultry chiller including an embodiment of an integral sump compartment in accordance with the present invention.

Referring now and more detailed to the drawings, in which like numerals indicate like parts throughout the several views, FIG. 3 illustrates a schematic diagram of a poultry chiller 100 including an integral sump compartment 160, as viewed from the top. The poultry chiller 100 includes a semi-cylindrical water reservoir or tank 102, an auger 120 having a helical blade structure 124 disposed about an auger shaft 122, and a water circulation means, or chill water system 130.

The auger 120 is positioned longitudinally in the tank 102 and supported at its opposing ends. An electric motor or other conventional power means (not shown) is provided to rotate the auger 120. The auger 120 includes a helical blade structure 124 formed around the auger shaft 122. During operation of the poultry chiller 100, birds are urged from the bird inlet end 104 of the tank 102 to the bird outlet end 106 of the tank 102 as the chill water flows in the opposite direction. As shown, the poultry chiller 100 includes an integral sump compartment 160, according to the present invention. The integral sump compartment 160 is disposed between the inlet end plate 108 and the transverse wall 150. The above noted chill water system 130 includes a recirculation pump 131, a heat exchanger 148, a suction header 136 having a suction valve 142, a fill header 138 having a fill valve 144, and a recirculation header 140 having a recirculation valve 146. The suction header 136 takes suction from the integral sump compartment 160 and the recirculation header 140 is in fluid communication with both the fill header 138 and the integral sump compartment 160, such that the contents of the integral sump compartment 160 can be continually recirculated by the recirculation pump 131.

Figure 4:
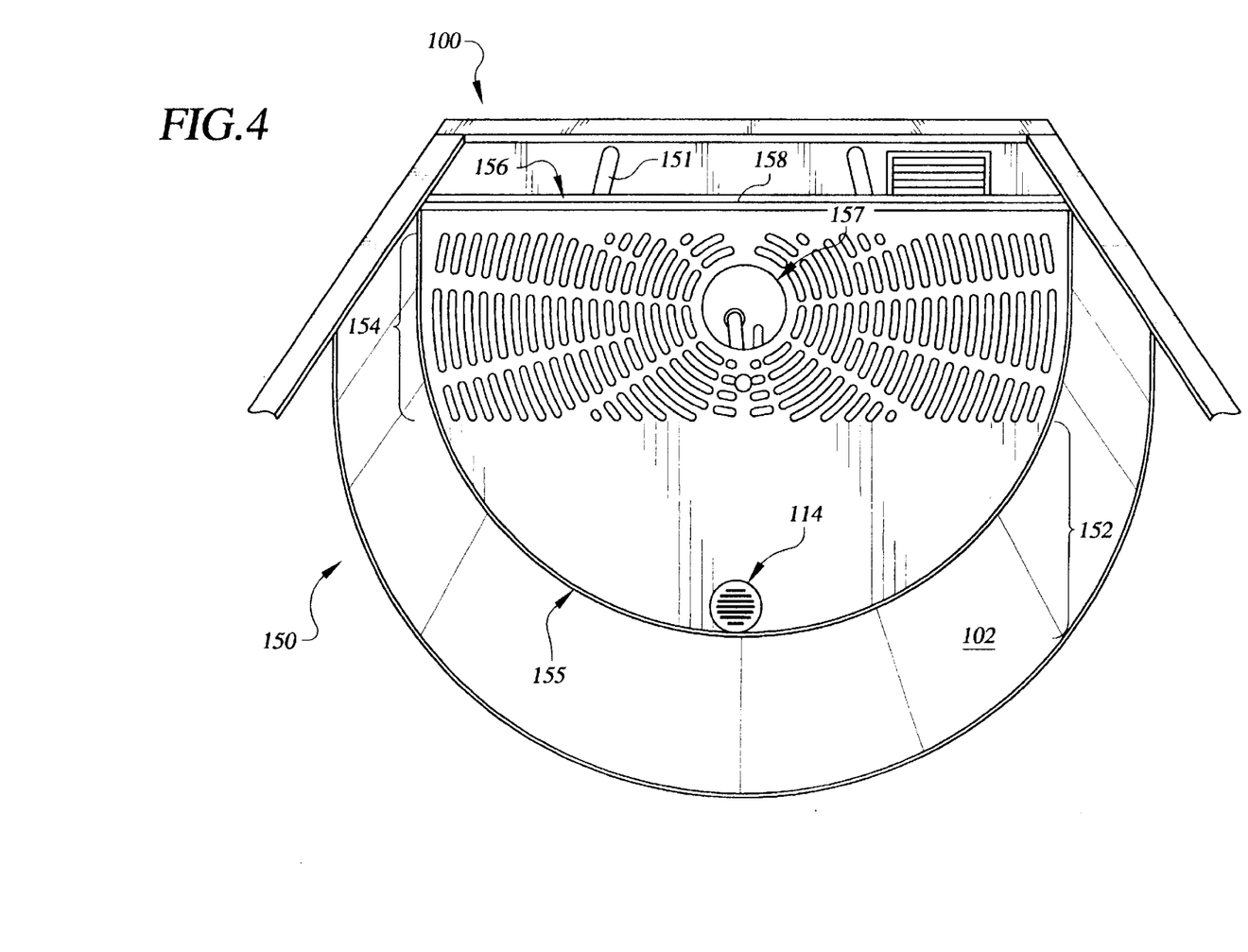
FIG. 4 is a perspective view of a bird inlet end of a poultry chiller including an embodiment of an integral sump compartment in accordance with the present invention.

Referring now to FIG. 4, a preferred embodiment of the transverse wall 150 according to the present invention is shown. The transverse wall 150 includes a lower portion 152, a central portion 154, and a top edge 156. The transverse wall 150 is disposed at the bird inlet end 104 of the poultry chiller 100 such that the transverse wall 150 is substantially parallel to the inlet end plate 108. As shown, the outer periphery 155 of the transverse wall 150 is substantially similar to the cross section of the tank 102. The lower portion 152 of the transverse wall forms a water-tight solid partition between the integral sump compartment 160 (FIG. 3) and the remainder of the tank 102. The central portion 154 of the transverse wall 150 defines a water passage for allowing the free flow of water from the portion of the tank 102 that includes the helical blade structure 124 (FIG. 3) into the integral sump compartment 160. As well, the central portion 154 preferably includes an auger aperture 157 configured to allow the auger shaft 122 to extend therethrough. As shown, the water passage formed in the central portion 154 is comprised of a plurality of apertures, such as radial slots, that allow the free flow of water therethrough while preventing the passage of birds from the portion of the tank 102 that is used to chill the birds into the integral sump compartment 160. As such, the central portion 154 prevents the birds from potentially blocking the inlet to the suction header 136. Preferably, a stiffening member 158 is provided along the top edge 156 to lend rigidity to the transverse wall 150. Support bars 151 can be used to help secure the transverse wall 150 within the tank 102.

Figure 5:
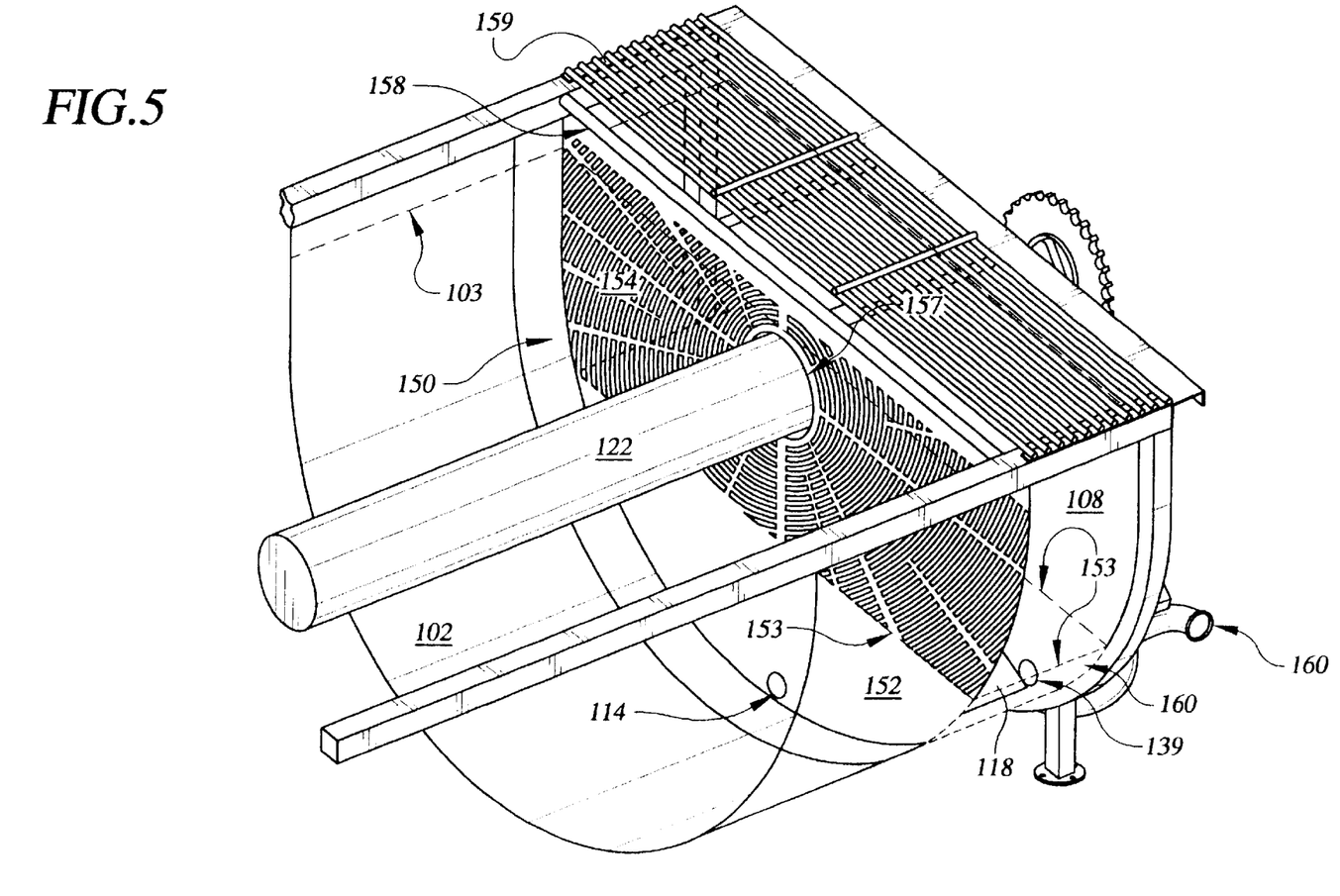
FIG. 5 is a side perspective partially cut-away view of a bird inlet end of a poultry chiller including an embodiment of an integral sump compartment in accordance with the present invention.

FIG. 5 is perspective side view of the bird inlet end 104 of a poultry chiller 100 including a transverse wall 150. For ease of description, a side wall of the tank 102 has been omitted. Dashed line 103 indicates a typical water level in the poultry chiller 100 that is maintained while chilling birds within the tank 102. As shown, the water level during regular operations is maintained preferably above the auger shaft 122. Preferably, a substantial portion of the central portion 154 of the transverse wall 150 is disposed below the normal water lever 103. As such, the transverse wall 150 does not impede the flow of water from the bird outlet end 106 (FIG. 3) to the bird inlet end 104 of the tank 102. Therefore, the recirculation pump 131 is able to take suction through the suction header inlet 137, which is disposed within that portion of the tank 102 that acts as the integral sump compartment 160.

Typically, poultry chillers 100 are cleaned daily, or after each operational run. First, the tank 102 is drained through the tank drain 114. As shown, the tank drain 114 is disposed in the lower portion 152 of the transverse wall 150 and extends through the integral sump compartment 160 and through the inlet end plate 108. The tank drain 114 is not in fluid communication with the integral sump compartment 160, and therefore drains the entire tank 102 with the exception of that portion disposed between the lower portion 152 of the transverse wall 150 and the inlet end plate 108, which comprises the integral sump compartment 160. That portion of the tank 102 which functions as the integral sump compartment 160 is indicated by dashed line 153. Preferably, the integral sump compartment 160 will have drain fittings (not shown) that allow the integral sump compartment 160 to be drained independently of the remainder of the tank 102. Numerous configurations of the water passage through the central portion 154 are possible. Note, the surface level of the volume of water within integral sump portion 160 will be determined by the lower most aperture of the water passage.

As shown, the tank drain 114 extends through the integral sump compartment 160 and is covered by a false bottom 118. The false bottom 118 simplifies the cleaning of the integral sump compartment 160 by reducing the number of surfaces that can trap foreign matter. As well, the poultry chiller 100 includes deflector means for preventing birds from entering the integral sump compartment 160 during operations, and thereby possibly blocking the suction header inlet 137. During operations, it is possible for the helical blade structure 124 (FIG. 3) to urge a bird upwardly along the surface of the transverse wall 150, thereby increasing the risk that the bird will be pushed over the top edge 156 of the transverse wall 150 and into the integral sump compartment 160. Preferably, the deflector means, shown as a grill 159, can be disposed between the top edge 156 of the transverse 150 and the inlet end plate 108. The grill 159 not only prevents those birds that are disposed in the chiller 100 from entering the integral sump compartment 160, but also prevents birds that are frequently moved above the poultry chiller 100 during production from being inveterately dropped into the integral sump tank 160.

OPERATION

During a typical processing run for chilling birds, the birds are placed in the bird inlet end 104 of the poultry chiller 100 on the auger side of the transverse wall 150. The auger 120 is rotated such that the helical blade structure 124 engages the birds, thereby urging them from the bird inlet end 104 to the bird outlet end 106 of the poultry chiller 100. As the birds are urged from the bird inlet end 104 to the bird outlet end 106, chill water flows in the opposite direction. The counter flow of chilled water opposite to that of the birds insures that the birds are always flowing in the cleanest and coldest possible chill water, and that a temperature differential is always experienced by the birds relative to the chill water as the birds move from the bird inlet end 104 to the bird outlet end 106. Once the chill water has traveled the length of the helical blade structure 124, it then flows through the water passage in the transverse wall 150 and into the integral sump compartment 160. The chill water is then removed from the integral sump compartment 160 and recirculated back to the bird outlet end 106 of the poultry chiller 100, where it is then reintroduced into the tank 102. The recirculation pump 131 takes suction on the chill water by way of the suction header 136, which includes a suction header inlet 139 disposed in the integral sump compartment 160. The recirculation pump 131 then discharges the chill water through a outlet 134 into the fill header 138, which includes a heat exchanger 148 for regulating the temperature of the chill water. From the heat exchanger 148, the chill water travelers through the fill header 138 and into the bird outlet end of the tank 106. In this manner, chill water is continuously recirculated through the poultry chiller 100 during routine chilling operations.

In order to maintain sanitary operating conditions, poultry chillers 100 are routinely cleaned. After a production run has been completed, any straggler birds are removed from the chiller 100 and the tank 102 is drained through the tank drain 114. In an preferred embodiment of the present invention, draining the tank 102 through the tank drain 114 will leave chill water remaining in the integral sump compartment 160, that volume of water being indicated in FIG. 5 by dashed line 153. The integral sump compartment 160 will also be drained through independent drain valves (not shown) prior to cleaning the poultry chiller 100. After the tank 102 has been drained, clean-up personnel spray down the tank 102 and the auger 120 with hot water, to be followed by a rinse down with cleaning solution, and a final rinse with water. The integral sump compartment 160 and chill water system 130 are cleaned by recirculating cleaning solution through the chill water system 130 using the recirculation pump 131.

To clean the integral sump compartment 160 and chill water system 130, clean-up personnel place cleaning solution in the empty integral sump compartment 160 and then fill the remaining volume of the integral sump compartment 160 with the appropriate amount of hot water. The integral sump compartment 160 is filled until water starts to flow out of the integral sump compartment 160 and into the tank 102 through the water passage of the central portion 154 of the transverse wall 150. After an adequate amount of cleaning solution and water has been mixed in the integral sump compartment 160, the fill valve 144 is closed and the recirculation valve 146 is opened to align the outlet 134 of the recirculation pump 131 with the integral sump compartment 160. With the chill water system 130 piping so aligned, the recirculation pump 131 is started. Typically, the recirculation pump 131 is run for 30 to 40 minutes, thereby recirculating cleaning solution through the suction header 136, the recirculation pump 131, the heat exchanger 148, a portion of the fill-header 138, and the recirculation header 140. After the cleaning solution has been circulated for an adequate amount of time, the recirculation pump is secured and the cleaning solution is drained from the integral sump compartment 160. The integral sump compartment 160 is then filled with fresh water which is then recirculated through the chill water system 130 to remove any residual cleaning solution. After draining the integral sump compartment 160, the recirculation valve 146 is closed and the fill valve 144 is opened, thereby realigning the fill header 138 with the bird outlet end 106 of the tank 102.

Preferred embodiments of the integral sump compartment 160 according to the present invention offer a number of advantages over existing configurations of sumps and clean-up tanks. Because embodiments of the present integral sump tank 160 serve as both a sump for the recirculation pump 131 and as a clean-up tank, only the suction header 136 is necessary for both normal chilling operations and clean-up operations. Therefore, the present integral sump compartment 160 reduces the amount of piping, fittings, and valves, required for these operations in existing systems. For example, existing clean up tanks 28 (FIG. 2), whether side-mounted or remotely located from the tank 102, require at least one extra run of piping and one extra valve (34a and 46, respectively) in order to be aligned with a suction header, as shown in FIG. 2. Also, as described above, clean-up operations using the integral sump compartment 160 clean the entire suction header 136. This reduces the expense and man hours required for clean-up operations in that manual cleaning of portions of the suction header is not required, as in existing systems. Also, embodiments of the integral sump compartment 160 of the present invention do not interfere with the placement of cat walks along the tank 102 and do not require excess floor space because the integral sump compartment is disposed at the bird inlet end 104 of the tank 102. The water passage formed in the central portion 154 of embodiments of the transverse wall 150 also creates a larger water return area for the chill water system 130 than do existing side mounted sumps. Therefore, the likelihood that birds will possibly block the water passage is reduced as is the potential for fluctuation of the inlet water temperatures to the heat exchanger 148.

Figure 6:
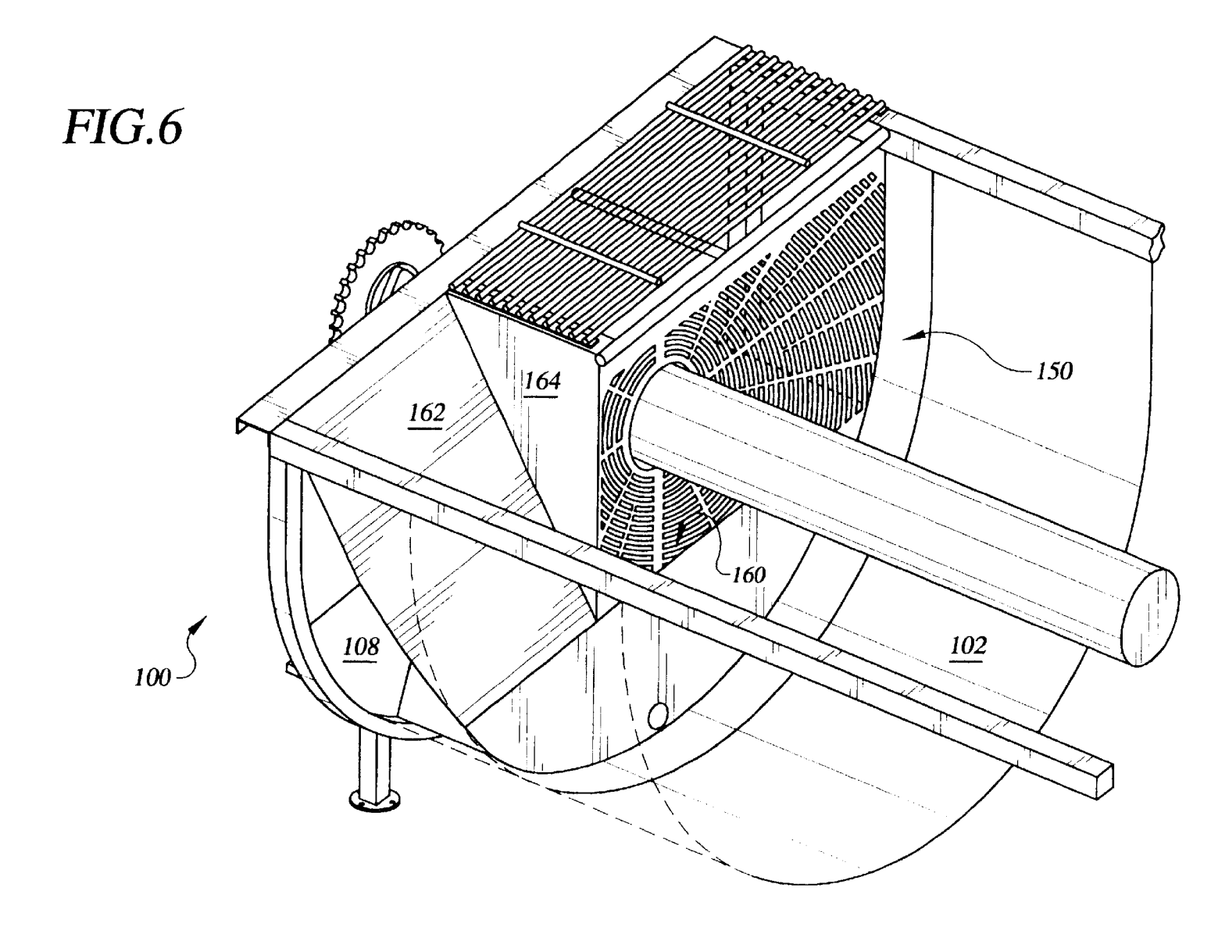
FIG. 6 is a side perspective partially cut-away view of a bird inlet end of a poultry chiller including an embodiment of an integral sump compartment in accordance with the present invention.

Another preferred embodiment of a poultry chiller 100 having an integral sump compartment 160 includes an inlet chute 162 as shown in FIG. 6. Preferably, the inlet chute runs from the inlet end plate 108 to the transverse wall 150 and assists in loading birds into the poultry chiller 100. As shown, the inlet chute 162 is separated from the integral sump compartment 160 by a longitudinal wall 164 to prevent birds from entering the integral sump compartment 160.

It should be emphasized that the above-described embodiments of the present poultry chiller 100 having an integral sump compartment 160, particular, any "preferred" embodiments, are merely possible examples of implementations, merely set forth for a clear understanding of the principles of the poultry chiller 100. Many variations and modifications may be made to the above-described embodiments of the poultry chiller 100 without departing substantially from the spirit and principles of the poultry chiller 100. All such modifications and variations are intended to be included herein within the scope of this disclosure of the poultry chiller 100 and protected by the following claims.

What is claimed is:

1. A chiller for reducing the temperature of previously eviscerated whole birds and the like, comprising:
   a tank having a bird outlet end, a bird inlet end, an inlet end plate, an outlet end plate, and a water reservoir between said ends;
   water circulation means for introducing water into said reservoir at said bird outlet end of said tank, draining water at said bird inlet end of said tank, and forming a movement of water generally from said bird outlet end toward said bird inlet end of said tank;
   a motive device for urging the birds from said bird inlet end to said bird outlet end of said tank;
   power means in driving relationship with said motive device;
   a transverse wall having a lower portion, a central portion, and a top edge, said transverse wall being disposed at said bird inlet end and substantially parallel to said inlet end plate; and
   wherein a sump is formed between said lower portion and said inlet end plate.

2. The chiller of claim 1, wherein said motive device further comprises an auger in said tank extending between said bird outlet end and said bird inlet end of said tank, said auger including an auger shaft and a helical blade structure mounted to and extending about said auger shaft.

3. The chiller of claim 2, wherein said helical blade structure includes a leading edge disposed adjacent to said transverse wall, said auger shaft extending through said transverse wall.

4. The chiller of claim 2, wherein said tank is an elongated semi-cylindrical open top tank defining a trough-shaped reservoir with an upper rim.

5. The chiller of claim 1, said central portion defining a water passage for passing water from one side to another side of said transverse wall.

6. The chiller of claim 5, wherein said water passage further comprises a plurality of apertures configured to prevent passage of the birds therethrough.

7. The chiller of claim 1, further comprising deflector means configured to prevent the birds from entering said sump.

8. The chiller of claim 7, wherein said deflector means further comprises a grill extending from said top edge to said inlet end plate.

9. The chiller of claim 7, further comprising a stiffening member extending along said top edge of said transverse wall.

10. The chiller of claim 1, said water circulation means further comprising a pump having an inlet and an outlet, a suction header, a fill header, and a recirculation header, wherein said suction header and said recirculation header are in fluid communication with said sump, said inlet is in fluid communication with said suction header, and said outlet is alternately in fluid communication with said recirculation header and said fill header.

11. The chiller of claim 10, wherein said water fill means further comprises a heat exchanger for cooling the water as it is circulated, said heat exchanger being disposed between said outlet and said inlet and recirculation headers.

12. The chiller of claim 1, wherein said sump has a capacity of 300 to 500 gallons.

13. The chiller of claim 1, further including a tank drain extending from said lower portion to said inlet end plate, thereby passing through said sump, said tank drain being configured to drain said water reservoir independently of said sump.

14. The chiller of claim 13, wherein said tank drain further comprises a drain pipe, said drain pipe being segregated from said sump by a false bottom.

15. The chiller of claim 1, wherein said motive device further comprises a drag device.

16. A transverse wall for forming a sump in a chiller for reducing the temperature of previously eviscerated whole birds and the like, the chiller including a tank having a bird outlet end plate, an auger including an auger shaft and a helical blade structure mounted to and extending about the auger shaft for urging the birds along the tank, comprising:

a lower portion;

a central portion;

a top edge;

an outer periphery, said outer periphery being shaped substantially similarly to a cross section of the tank; and wherein disposing said transverse wall in the tank substantially parallel to the bird outlet end plate forms the sump between said lower portion and the bird outlet end plate.

17. The transverse wall of claim 16, said central portion defining a water passage for passing water from one side to another side of said transverse wall.

18. The transverse wall of claim 17, wherein said central portion further defines an auger shaft opening such that the auger shaft may extend therethrough.

19. The transverse wall of claim 18, wherein said water passage further comprises a plurality of apertures configured to prevent the passage of the birds therethrough.

20. A chiller for reducing the temperature of previously eviscerated whole birds and the like, comprising:

a tank having a bird inlet end, a bird outlet end, an inlet end plate at said bird inlet end, an outlet end plate at said bird outlet end, and a water reservoir between said bird inlet and outlet ends;

a transverse wall extending across said tank having a lower portion, a central portion, and a top edge, said transverse wall being disposed at said bird inlet end near said inlet end plate and forming a sump between said transverse wall and said inlet end plate.

21. The chiller of claim 20, and further including a water recirculating system having a recirculation inlet in communication with said sump and a recirculation outlet in communication with said tank at said bird outlet end.

22. The chiller of claim 20, wherein said transverse wall lower portion is water impervious and said transverse wall central portion is water pervious, so that water moves over said lower portion and through said central portion and into said sump, and birds are restrained from moving through said central portion and into said sump.

23. A chiller for reducing the temperature of previously eviscerated whole birds and the like, comprising:

an elongated tank having opposed bird inlet and outlet ends and defining a reservoir there between;

a transverse wall extending across said tank at said bird inlet end and forming a sump at said bird inlet end;

a water circulation system for introducing water into said bird outlet end and draining water from said sump at said bird inlet end, said water circulation system including a pump and a heat exchanger; and a bypass for circulating water from said sump, through at least one of said pump and said heat exchanger, and back to said sump.

24. The chiller of claim 23, wherein said transverse wall includes a lower portion that is water impervious and a central portion that is water pervious, so that water circulates over said lower portion and through said central portion and into said sump and birds are retained out of said sump by said lower portion of said transverse wall.

25. The chiller of claim 23, and further including a drain conduit extending from said reservoir through said sump to the outside of said tank.

26. The chiller of claim 23, and further including an auger for advancing birds from said bird inlet end toward said transverse wall, said auger including a shaft extending along said elongated tank, and wherein said transverse wall includes an opening for receiving said shaft of said auger.

* * * * *